US011745741B2

(12) United States Patent
Knueven et al.

(10) Patent No.: US 11,745,741 B2
(45) Date of Patent: Sep. 5, 2023

(54) VEHICLE MONITORING STRATEGY FOR DETECTING UNINTENDED ACCELERATION DURING SPEED CONTROL

(71) Applicant: GM GLOBAL TECHNOLOGY OPERATIONS LLC, Detroit, MI (US)

(72) Inventors: Jacob M. Knueven, Southfield, MI (US); Jason C. Jousma, Holly, MI (US); Paul G. Otanez, Franklin, MI (US); Aubrey W. Downs, Jr., Brighton, MI (US); Joseph D. Hillegass, Waterford Township, MI (US); Abdoulaye T. Diallo, Wixom, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 57 days.

(21) Appl. No.: 17/206,616

(22) Filed: Mar. 19, 2021

(65) Prior Publication Data

US 2022/0297691 A1    Sep. 22, 2022

(51) Int. Cl.
*B60W 30/14*    (2006.01)
*B60K 31/00*    (2006.01)
(Continued)

(52) U.S. Cl.
CPC ........... *B60W 30/146* (2013.01); *B60K 31/00* (2013.01); *B60L 15/20* (2013.01); *G01P 3/44* (2013.01);
(Continued)

(58) Field of Classification Search
CPC ........... B60W 30/146; B60W 2530/10; B60W 2540/10; B60W 2540/12; B60K 31/00; B60K 2031/0091; B60L 15/20; B60L 2240/12; B60L 2240/14; G01P 3/44; G01P 15/08; B60Y 2200/91
See application file for complete search history.

(56) References Cited

U.S. PATENT DOCUMENTS 11,285,948 B2 *   3/2022   Schwartz ........ B60W 30/18109
2013/0345913 A1 * 12/2013   Krueger .................... B60T 8/17
                                                              701/22
(Continued)

*Primary Examiner* — James M McPherson
*Assistant Examiner* — Kyle J Kingsland
(74) *Attorney, Agent, or Firm* — Quinn IP Law

(57) ABSTRACT

A method detects unintended acceleration of a motor vehicle during a closed-loop speed control mode by determining external forces on the vehicle via a controller, and then calculating a desired acceleration using a measured vehicle speed and the external forces. The method includes determining an actual acceleration of the vehicle, including filtering a speed signal as a first actual acceleration value and/or measuring a second actual acceleration value using an inertial measurement unit (IMU). During the speed control mode, the method includes calculating an acceleration delta value as a difference between the desired acceleration and the actual acceleration, and then using the acceleration delta value to detect the unintended acceleration during the speed control mode. A powertrain system for the motor vehicle, e.g., an electric vehicle, includes the controller and one or more torque generating devices coupled to road wheels of the vehicle.

20 Claims, 3 Drawing Sheets

(51) Int. Cl.
   *B60L 15/20* (2006.01)
   *G01P 15/08* (2006.01)
   *G01P 3/44* (2006.01)
   *B60K 6/22* (2007.10)

(52) U.S. Cl.
   CPC ............... *G01P 15/08* (2013.01); *B60K 6/22* (2013.01); *B60K 2031/0091* (2013.01); *B60L 2240/12* (2013.01); *B60L 2240/14* (2013.01); *B60W 2530/10* (2013.01); *B60W 2540/10* (2013.01); *B60W 2540/12* (2013.01); *B60Y 2200/91* (2013.01); *B60Y 2200/92* (2013.01)

(56) References Cited

U.S. PATENT DOCUMENTS

| | | | |
|---|---|---|---|
| 2015/0151739 A1* | 6/2015 | Park | B60W 10/08 |
| | | | 701/54 |
| 2015/0338856 A1* | 11/2015 | Vernacchia | B60W 30/18 |
| | | | 180/65.265 |
| 2016/0280307 A1* | 9/2016 | Takenaka | B62K 5/08 |
| 2018/0186352 A1* | 7/2018 | Goto | B60T 8/00 |
| 2018/0304869 A1 | 10/2018 | Hernandez | |
| 2019/0193569 A1* | 6/2019 | Oh | B60W 40/107 |

* cited by examiner

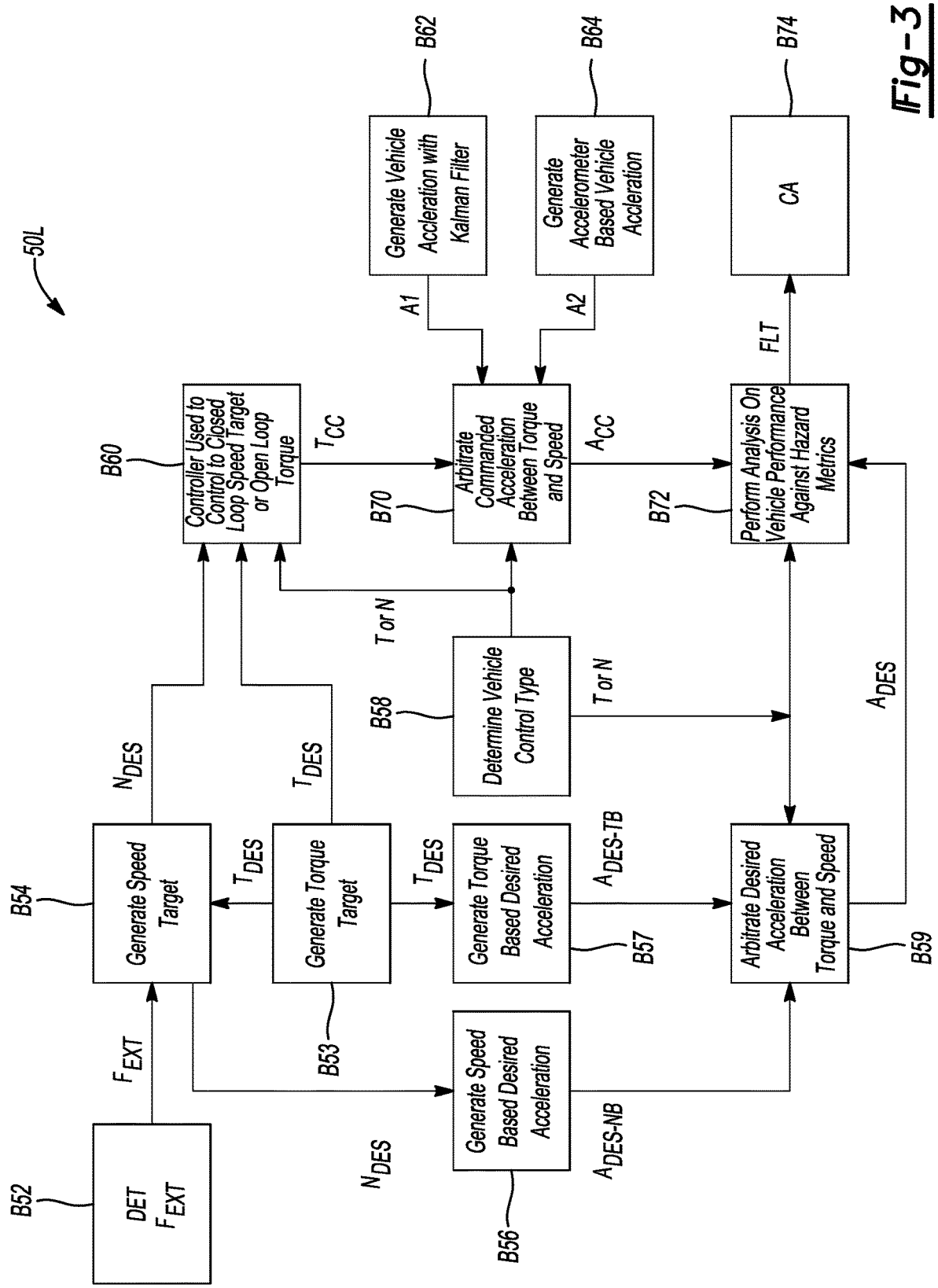

VEHICLE MONITORING STRATEGY FOR DETECTING UNINTENDED ACCELERATION DURING SPEED CONTROL

INTRODUCTION

Vehicular powertrains include an internal combustion engine and/or one or more rotary electric machines. Battery electric vehicles and hybrid electric vehicles in particular include one or more high-voltage electric propulsion motors, respective output shafts of which are coupled to one or more road wheels, e.g., via a corresponding drive axle. When the propulsion motor is energized by multi-cell battery pack, fuel cell stack, or other voltage supply, output torque is delivered to the road wheels. Operation of an electric propulsion motor in its capacity as an electric generator during a regenerating braking event generates electricity, which is then used to recharge constituent cells of the battery pack and/or to power onboard electrical functions.

Powertrain systems of certain motor vehicles utilize a closed-loop speed control function to maintain a driver-requested vehicle speed. Hybrid and battery electric vehicles may be capable of executing a low-speed drive mode often referred to as "one-pedal driving" or OPD, which allows an operator of the motor vehicle to maintain speed or fully stop the motor vehicle using one or more driver input devices. During speed control, releasing the accelerator pedal or brakes, or activating a Regen-on-Demand paddle, results in application of a calibrated amount of regenerative resistance by the propulsion motor(s) coupled to the road wheels. This in turn has the effect of slowing the motor vehicle while simultaneously generating electrical energy. OPD and other closed-loop speed control modes help simplify the driving task, particularly in stop-and-go traffic. However, existing acceleration hazard monitoring solutions of the types used to detect and respond to threshold acceleration events outside of expected norms may be less than optimal in terms of efficiency and false failure modes when used during such speed control modes.

SUMMARY

Disclosed herein are methods and accompanying systems for improving upon traditional acceleration-based hazard monitoring aboard a motor vehicle, with a goal of reducing instances of false failures due to erroneously detected unintended acceleration events. Although negative acceleration is often referred to in the art as deceleration, for simplicity of terminology the terms "acceleration" and "acceleration event" as used herein broadly encompass both positive and negative speed-based accelerations of the motor vehicle. While possibly beneficial when used in certain higher speed open-loop torque control modes, the present teachings may be of particular benefit when performed during closed-loop speed control modes, regardless of vehicle speed. Such a speed control mode is exemplified herein but not limited to the aforementioned one-pedal driving maneuver (OPD).

The acceleration-based control solutions described below with reference to the various Figures specifically account for external forces acting on the motor vehicle when determining a desired acceleration. Relevant external forces considered within the scope of the present disclosure may include, by way of illustration and not limitation, measured and/or calculated road loads, grade loads, vehicle mass, or other relevant external loads. Such external forces require application of additional drive torque from one or more onboard prime movers or torque generating devices for a given target speed or torque. Absent the present teachings, vehicle performance may not pass onboard acceleration-based hazard metrics when the vehicle otherwise should do so, with avoidable false-fail results possibly leading to a "dead pedal" condition and/or the need to initiate a new key cycle.

As will be appreciated by those skilled in the art, motor vehicles equipped with OPD capability or other closed-loop speed control modes tend to rely on a propulsion controller to determine a commanded acceleration. The commanded acceleration is typically derived by dividing a commanded output torque determined by the propulsion controller by a static vehicle mass value. A calibrated pedal map with the same nominal mass value may be used to calculate a desired acceleration. The controller then compares the commanded acceleration value to the desired acceleration when detecting acceleration hazards. The present approach is intended to improve upon such methods using actual acceleration values in lieu of the above-noted commanded acceleration, and also by accounting for external forces acting on the motor vehicle when determining the desired acceleration as noted above.

In a particular embodiment, a method for detecting an unintended acceleration of a motor vehicle during a closed-loop speed control mode, such as OPD, includes calculating a desired acceleration via a controller using a speed profile of the motor vehicle. The method also include determining an actual acceleration. This may entail measuring vehicle speed, deriving the speed profile from the measured speed, and differentiating the speed profile to determine the desired acceleration. During the closed-loop speed control mode, the controller calculates an acceleration delta value in real-time as a difference between the desired acceleration and an actual acceleration. The controller then uses the acceleration delta value to detect the unintended acceleration during the speed control mode.

Determining the actual acceleration of the motor vehicle may include one or both of filtering a measured speed signal of the motor vehicle from the measured vehicle speed and derived speed profile to produce a first speed signal, followed by differentiating the first speed signal to produce the first actual acceleration value, and/or measuring a second actual acceleration value using an inertial measurement unit (IMU) or other suitable sensor(s). Filtering the speed signal could include filtering an output signal from a speed sensor using a Kalman filter, or alternatively a low-pass filter or another application-suitable filter in different implementations. Differentiation of the resulting speed signal produces the first actual acceleration value.

Calculating the desired acceleration within the scope of the disclosure may include determining external forces on the motor vehicle, including measuring and/or calculating a road load, a grade load, a mass load, and/or a braking load in possible embodiments.

The method may include temporarily reducing output torque and/or output speed of the powertrain system, up to or short of possibly disabling the powertrain system. Such remedial actions may occur when the acceleration delta value exceeds a calibrated threshold indicative of the unintended acceleration, or OPD capability.

The motor vehicle includes an electric propulsion motor and one or more driver input devices, typically an accelerator pedal, a brake pedal, and possibly a Regen-on-Demand paddle. The driver input device(s) is responsive to an operator request. In a possible use scenario, the speed control mode is the above-noted OPD mode in which a rotary speed of the electric traction motor, in this instance, is controlled below a threshold angular speed solely in response to an operator request provided via the driver input device(s).

A powertrain system for a motor vehicle is also disclosed herein. An embodiment of the powertrain system includes at least one torque generating device, e.g., an internal combustion engine and/or a rotary electric machine, and a controller. Each torque generating device is operatively coupled to a set of road wheels of the motor vehicle. The controller is configured for detecting an unintended acceleration (positive or negative in direction) of the motor vehicle during a closed-loop speed control mode. Execution of instructions by the controller causes the controller to perform the above-described method.

Additionally, an aspect of the present disclosure includes an electric vehicle having the above-noted controller, driver input device(s), road wheels, and a torque generating device coupled to one or more of the road wheels. The controller is configured to execute the present method.

The above summary does not represent every embodiment or every aspect of this disclosure. The above-noted features and advantages of the present disclosure, as well as other possible features and advantages, will be readily apparent from the following detailed description of the embodiments and best modes for carrying out the disclosure when taken in connection with the accompanying drawings and appended claims. Moreover, this disclosure expressly includes combinations and sub-combinations of the elements and features presented above and below.

BRIEF DESCRIPTION OF THE DRAWINGS

FIG. 3 is a schematic logic flow diagram illustrating an embodiment of the present control strategy.

DETAILED DESCRIPTION

Figure 1:
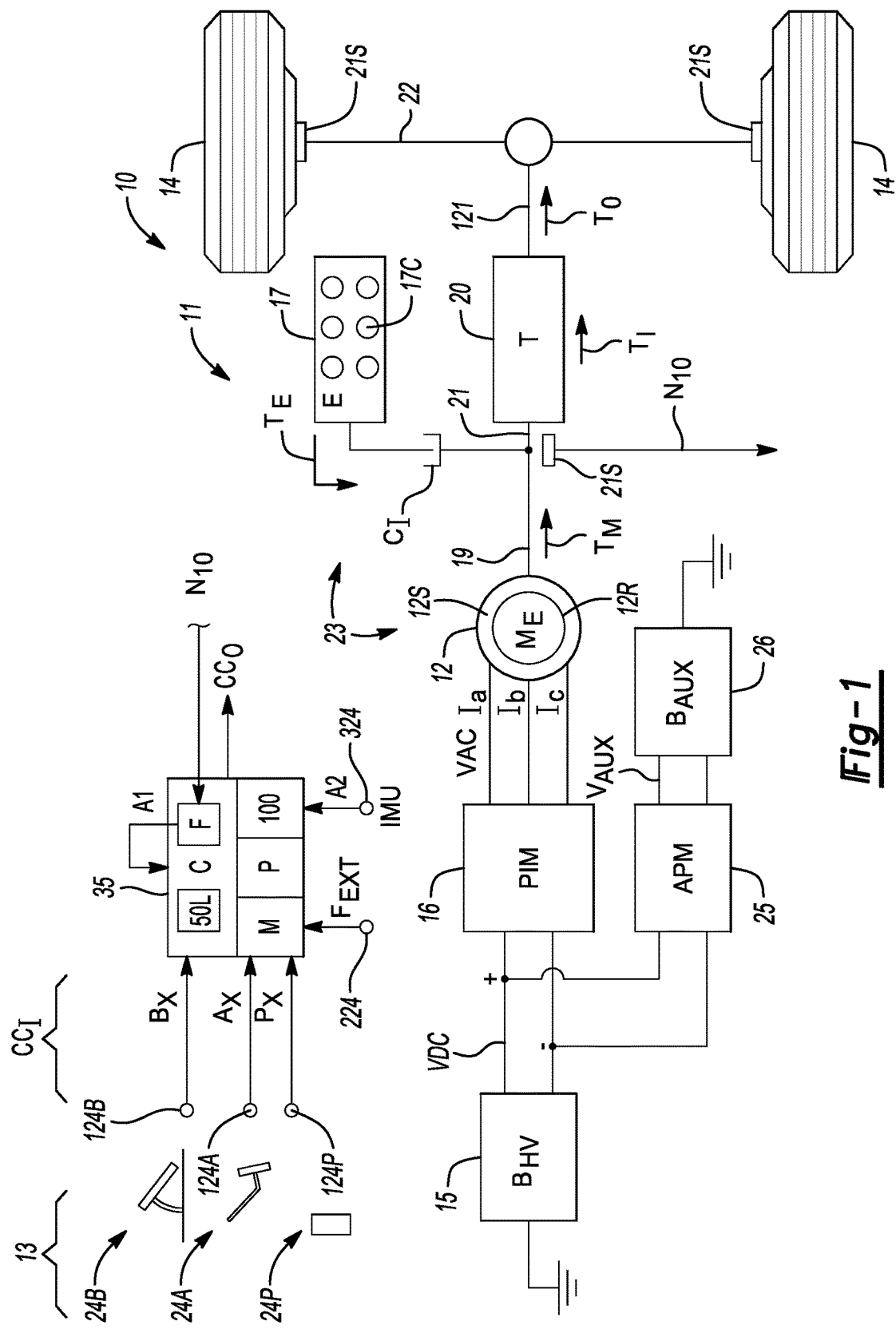
FIG. 1 is a schematic illustration of an exemplary motor vehicle having a powertrain system inclusive of a controller, with the controller configured to detect an unintended positive or negative acceleration of the motor vehicle during a closed-loop speed control mode using the method set forth herein.

The present disclosure is susceptible of embodiment in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, "any" and "all" shall both mean "any and all", and the words "including", "containing", "comprising", "having", and the like shall mean "including without limitation". Moreover, words of approximation such as "about", "almost", "substantially", "generally", "approximately", etc., may be used herein in the sense of "at, near, or nearly at", or "within 0-5% of", or "within acceptable manufacturing tolerances", or logical combinations thereof.

Referring to the drawings, wherein like reference numbers refer to like components, FIG. 1 schematically depicts a motor vehicle 10 having a powertrain system 11 coupled to a set of road wheels 14. The motor vehicle 10 is capable of operating in a closed-loop speed control mode, e.g., a one-pedal drive (OPD) mode or another closed-loop speed control mode typically but not necessarily executed below threshold low vehicle speeds. As part of the present disclosure, a controller (C) 35 is configured to monitor ongoing acceleration-based hazard performance of the motor vehicle 10 and its resident powertrain system 11 during the speed control mode for unintended positive or negative acceleration (positive or negative, as noted above), with possible extension of the present teachings to open-loop torque control modes occurring at higher vehicle speeds.

Acceleration-based hazard monitoring conducted in accordance with the present disclosure occurs in real-time using a method 100, a representative embodiment of which is described below with reference to FIG. 2. The controller 35 may execute appropriate dynamic and/or logic state-changing control actions with respect to the powertrain system 11 in response to monitoring results, such as when the method 100 reveals that an acceleration threshold, such as 0.2-0.4 g in 400-600 ms or another application-suitable threshold, has been exceeded. Associated control logic 50L suitable for implementing the method 100 is programmed in memory (M) of the controller 35 and executed using one or more processors (P) in the manner set forth below.

As part of its programmed functionality, the controller 35 shown in FIG. 1 may receive input signals (arrow $CC_I$) from a driver input device or devices 13, with the input signals (arrow $CC_I$) being indicative of an output speed request and/or torque request. For instance, sensors 124A and 124B of an accelerator pedal 24A and a brake pedal 24B, respectively, may respectively generate corresponding acceleration request signal (arrow $A_X$) and a braking request signal (arrow $B_X$). Alternatively, a sensor 124P of a Regen-on-Demand paddle 24P may generate an OTP request signal (arrow $P_X$). During an OPD maneuver in particular, e.g., when a rotary electric machine ($M_E$) 12, internal combustion engine 17, and/or another torque generating device 23 is used as part of the powertrain system 11, an operator may control the speed of the motor vehicle 10 exclusively using the driver input device 13. For example, releasing the accelerator pedal 24A below a threshold low speed may have the effect of slowing and ultimately stopping the motor vehicle 10.

Additional input signals (arrow $CC_I$) to the controller 35 within the scope of the present disclosure may include a measured acceleration value (arrow A2) from an inertial measurement unit (IMU) 324, e.g., one or more accelerometers configured to measure longitudinal acceleration, and possibly lateral acceleration, pitch, yaw, and roll as needed. External load sensors (224) collectively measure and report values indicative of external forces ($F_{EXT}$) on the motor vehicle 10 for the purpose of determining a desired acceleration as set forth herein. Exemplary measured and/or calculated forces on the motor vehicle 10 may include a road load, a grade load, a mass load, and/or a braking load of the motor vehicle, with the latter possibly informed by the braking request signal (arrow $B_X$).

The controller 35 may also include a filter (F) which is configured to receive a measured speed signal (arrow $N_{10}$) indicative of ground speed of the motor vehicle 10, e.g., from one or more speed sensors 21S, e.g., a resolver or rotary encoder, a wheel speed sensor, etc. As explained in detail below with reference to FIGS. 2 and 3, the filter F outputs a first actual acceleration value (A1), while the IMU 324 outputs a second actual acceleration value as the above-noted acceleration value A2, with the acceleration values A1 and/or A2 used by the controller 35 in the disclosed manner when performing the present method 100.

In the illustrated exemplary configuration of FIG. 1 in which the motor vehicle 10 is embodied as a hybrid electric vehicle, the engine 17 has multiple engine cylinders 17C. While a single rotary electric machine 12 is depicted in FIG. 1 for illustrative simplicity, those skilled in the art will appreciate that other battery electric or hybrid electric configurations of the powertrain system 11 may be readily envisioned within the scope of the present disclosure, e.g., using more than one rotary electric machine 12, more than two powered road wheels 14, foregoing use of the engine 17, etc.

In the non-limiting hybrid electric embodiment of the motor vehicle 10, motor output torque (arrow $T_M$) from an output shaft 19 of the electric machine 12 and/or engine torque (arrow $T_E$) from the engine 17 may be directed to a transmission (T) 20 via a transmission input member 21 as input torque (arrow $T_I$). Output torque (arrow $T_O$) from the transmission 20 is then conveyed via an output member 121 to one or more drive axles 22, and from there, to one or more of the road wheels 14. The engine 17 may be selectively connected to and disconnected from the input member 21 via an input clutch $C_I$, e.g., a friction clutch or a hydrokinetic torque converter assembly.

In a representative polyphase/alternating current (AC) embodiment, the rotary electric machine 12 includes a stator 12S coaxially arranged with a rotor 12R in a typical radial flux configuration, with the present teachings also being extendable to axial flux configurations. When the electric machine 12 is constructed as an AC machine as shown, the powertrain system 11 may include an onboard power supply, depicted as a high-voltage traction battery pack ($B_{HV}$) 15, e.g., a multi-cell rechargeable lithium-ion battery pack. A fuel cell system or another suitable power supply may be used in other embodiments. While the term "high-voltage" is relative to typical 12-15V auxiliary voltage levels, and thus may entail voltage levels anywhere in excess thereof, exemplary battery electrified propulsion applications of the type contemplated herein may require the battery pack 15 to have a voltage capability of 300-500V or more.

Instructions for implementing the method 100 are recorded in memory (M), and executed by one or more of the processors (P) in real-time in response to the input signals (arrow $CC_I$). Upon execution of the instructions, the controller 35 achieves a particular control outcome via output signals (arrow $CC_O$), with the controller 35 possibly executing preemptive or responsive control actions such as shutting down the powertrain system 11, recording a diagnostic code, generating a text message, illuminating an indicator lamp within the motor vehicle 10, or performing various other possible control actions in different embodiments. Although omitted for simplicity, the controller 35 may include one or more electronic control modules, units, processors, and associated hardware components thereof, and would be equipped with sufficient tangible and nontangible variants of the memory (M), Application Specific Integrated Circuits (ASICs), systems-on-a-chip (SoCs), input/output circuitry, high-speed clocks or oscillators, and other hardware and software as needed to provide a desired functionality.

Still referring to FIG. 1, the battery pack 15 may be electrically connected to a power inverter module (PIM) 16 via a high-voltage direct current voltage bus (VDC), with the PIM 16 in turn electrically connected to the stator 12S via a high-voltage AC voltage bus (VAC). Although omitted for illustrative simplicity, the PIM 16 is internally configured and externally controlled via ON/OFF state control of multiple dies of semiconductor switches, with such switches typically embodied as IGBTs or MOSFETs. Thus, a DC input voltage to the PIM 16 is inverted and controlled to ultimately deliver an AC output voltage and corresponding phase currents (Ia, Ib, Ic) by high-speed pulse width modulation or other suitable switching operations of the PIM 16. During a regenerating event such as braking, the PIM 16 may operate in the opposite manner, i.e., by converting an AC input voltage into a DC output voltage suitable for recharging constituent battery cells of the battery pack 15.

Other components may be connected as shown in FIG. 1, such as but not limited to the illustrated DC-DC converter/ auxiliary power module (APM) 25 and a lead-acid or other type of auxiliary battery ($B_{AUX}$) 26 operating at a lower auxiliary voltage ($V_{AUX}$). As noted above, auxiliary voltage levels are typically 12-15V, and therefore the APM 25 may operate through internal switching operations and signal filtering, as is well understood in the art, to receive a relatively high DC voltage from the DC voltage bus (VDC) and output the auxiliary voltage ($V_{AUX}$) to the auxiliary battery 26. The electric machine 12 is therefore just one of multiple devices requiring the reliable and sustained provision of electrical energy from the battery pack 15 during ongoing propulsion operations of the motor vehicle 10.

Figure 2:
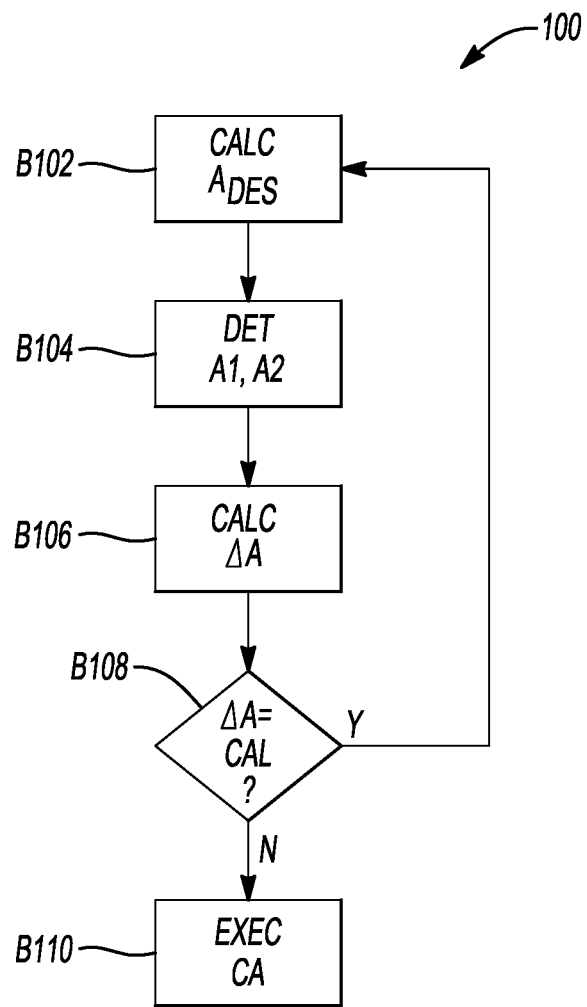
FIG. 2 is a flow chart describing an exemplary embodiment of the present method.

Referring now to FIG. 2, the method 100 is configured to detecting an unintended acceleration of the motor vehicle 10 (positive or negative) during a closed-loop speed control mode. The above-noted one-pedal drive (OPD) maneuver is representative of such a speed control mode. The method 100 may be used in embodiments of the motor vehicle 10 having the powertrain system 11, i.e., one having at least one torque generating device 13, in this instance the rotary electric machine 12 and the engine 17, or the motor vehicle 10 may use the electric machine(s) 12 or the engine 17 alone. The method 100 may be performed with the assistance of the control logic 50L, a representative embodiment of which is shown in FIG. 3 and described below.

Commencing at logic block B102, the method 100 includes calculating a desired acceleration ("CALC $A_{DES}$") via the controller 35 of FIG. 1 using a derived speed profile of the motor vehicle 10. The speed profile may be generated during a drive cycle using the measured speed signal (arrow $N_{10}$), such as by recording measured speeds as a speed trajectory over time according to a calibrated sampling interval.

As part of the method 100, logic block B102 also entails measuring or otherwise determining the external forces ($F_{EXT}$ of FIG. 1) acting on the motor vehicle 10, including possibly a road load, a grade load, a mass load, and/or a braking load of the motor vehicle 10. Measurements and/or calculations indicative of such forces could be collected in real-time during operation of the motor vehicle 10 and communicated to the controller 35 using a controller area network or other suitable wired or wireless transfer conductors. The controller 35 then calculates the desired acceleration in a manner that accounts for the external forces ($F_{EXT}$). The method 100 proceeds to logic block B104 once the desired acceleration has been determined.

Logic block B104 ("DET A1, A2") includes filtering the measured speed signal ($N_{10}$) of the motor vehicle 10 from the above-noted speed profile of logic block B102 through the filter F to produce a first speed value, and then differentiating the first speed value to produce the first actual acceleration value (A1). Filtering the speed signal (arrow $N_{10}$) of the motor vehicle 10 may be accomplished using a Kalman filter or another suitable filter, such as but not limited to a low-pass filter in another embodiment. Logic block B104 may also include measuring the second actual acceleration value (A2) using the IMU 324 shown in FIG. 1 or another application-suitable sensor. While either the filter (F) or the IMU 324 may be used alone in some embodiments, use of both together may provide fidelity advantages, e.g., by using a weighted average of the values. The method 100 then proceeds to logic block B106.

Logic block B106 of FIG. 2 ("CALC ΔA") includes, during the closed-loop speed control mode, calculating an acceleration delta value using the controller 35. As used herein, the acceleration delta value is a difference between the desired acceleration determined at logic block B102 and the first actual acceleration value (A1) and/or the second actual acceleration value (A2). When the motor vehicle 10 includes the accelerator pedal 24A, for instance, the closed-loop speed control mode may be the aforementioned OPD mode in which a rotary speed of the torque generating device(s) 13 is closely controlled solely in response to actuation of the accelerator pedal 24A, or another of the described driver input devices 13 of FIG. 1. The method 100 proceeds to logic block B108 once the acceleration delta value has been derived.

At logic block B108, the controller 35 of FIG. 1 next uses the acceleration delta value from logic block B106 to detect the unintended acceleration event during the speed control mode. In a possible implementation, the controller 35 may compare the acceleration delta value to a calibrated acceleration threshold ("ΔA=CAL?"). Exceeding such a threshold would be indicative of an unintended acceleration of the motor vehicle 10, possibly triggering a control action as described below. The method 100 proceeds to logic block B110 when unintended acceleration event is detected, and repeats logic block B102 in the alternative if the unintended acceleration is not detected.

Logic block B110 of FIG. 2 includes executing a control action ("EXEC CA") via the controller 35 of FIG. 1 in response to the detected unintended acceleration event. Such a control action may include changing a dynamic state of the motor vehicle 10 while permitting limited functions of the powertrain system 11, including possibly reducing an output torque (arrow $T_O$ of FIG. 1) of the powertrain system 11 and/or an action output speed of the motor vehicle 10, the latter effectively being the measured vehicle speed (arrow $N_{10}$). The controller 35 in more aggressive dynamic state-changing control actions may include temporarily disabling the powertrain system 11 entirely when the acceleration delta value of logic block B106 exceeds a calibrated threshold indicative of the unintended acceleration, e.g., 0.1-0.3 g in about 300-600 ms, about 0.2 g in 500 ms, etc. Short of fully disabling the powertrain system 11, however, such as when the acceleration hazard limit is closely approached but not exceeded, the controller 35 could simply record a diagnostic code indicative of approaching the acceleration-based hazard limits, or the controller 35 could transmit a text message to the operator and/or a remote server, illuminate an indicator lamp (not shown) within the motor vehicle 10, etc., as application-suitable remedial actions.

Referring now to FIG. 3, the control logic 50L for implementing the method 100 is shown in a possible embodiment. While depicted schematically as additional logic blocks B52-B74, those skilled in the art will appreciate that each constituent logic block may be implemented as a set of computer-readable instructions or code, associated input/output hardware, signal processing devices, and the above-noted memory (M) and processor (P) of FIG. 1.

Logic bock B52 of FIG. 3 ("DET $F_{EXT}$") is used to measure, calculate, or otherwise detect external forces acting on the motor vehicle 10 of FIG. 1, as noted above, with such forces possibly including a road load, a grade load, a mass load, and/or a braking load of the motor vehicle 10. As depicted in FIG. 1, various external force sensors 224 may be used to measure some of these values, e.g., an angle of inclination of a road surface or the motor vehicle 10 relative thereto for calculating the grade load, while others such as mass and road load may be calibrated, calculated, and/or reported to the controller 35. Braking forces likewise may be derived from the braking request signals (arrow $B_X$), as appreciated in the art. The external forces (arrow $F_{EXT}$), once measured or otherwise determined in this manner, are fed into logic block B54.

Logic block B53 is used to generate a torque target as a desired torque ($T_{DES}$). As will be appreciated by those skilled in the art, determination of torque targets is typically performed via a propulsion control unit of a given motor vehicle, and thus the controller 35 described herein may determine this value as part of its ordinary operating function. Inputs used to determine the desired torque ($T_{DES}$) include the acceleration and braking request signals (arrows $A_X$ and $B_X$ of FIG. 1), the measured vehicle speed ($N_{10}$), mass of the motor vehicle 10, etc. The desired torque ($T_{DES}$) is fed into logic block B54.

Logic block B54 is used by the controller 35 to generate a speed target in the form of a desired speed ($N_{DES}$). Inputs to logic block B54 include (a) the desired torque ($T_{DES}$) from logic block B53 described above, and (b) the external forces ($F_{EXT}$) from logic block B52. A lookup table or calculation using the desired torque ($T_{DES}$) and the external forces ($F_{EXT}$) may be used to derive the desired speed ($N_{DES}$) in an exemplary embodiment. The desired speed ($N_{DES}$) is then fed into logic blocks B56 and B60 as described below.

Logic block B56 receives the desired speed ($N_{DES}$) from logic block B54 as an input, and thereafter generates a speed-based desired acceleration ($A_{DES-NB}$). As appreciated in the art, knowledge of the present measured vehicle speed ($N_{10}$) and the desired speed ($N_{DES}$) enables the controller 35 to determine how much acceleration is required, once again with "acceleration" having a positive direction or a negative direction. This value is then fed into logic block B59.

At logic block B57, the controller 35 receives the desired torque ($T_{DES}$) from logic block B53 and generates a torque-based desire acceleration ($A_{DES-TB}$). This speed-based desired acceleration ($A_{DES-NB}$) value is fed into logic block B59.

Logic block B58 is used to determine the vehicle control type, i.e., closed-loop speed control or open-loop torque control. The decision as to which control type to use may be encoded as a simple speed-based decision, e.g., entering a closed-loop speed control mode when operating below a threshold speed such as 10 KPH, or at higher speeds, either automatically or in response to an operator request. The controller 35 then outputs a control signal, such as a bit flag of 1 corresponding to torque control (T) or a bit flag of 0 corresponding to speed control (N), or vice versa, with such values communicated to logic blocks B59, B60, B70, and B72.

At logic block B59, the controller 35 next arbitrates desired acceleration between the torque-based value ($A_{DES-TB}$) from logic block B57 and the acceleration-based value ($A_{DES-NB}$) from logic block B56. This decision is performed in response to the output from logic block B58, i.e., open-loop torque control (type T) corresponds to use of the torque-based value ($A_{DES-TB}$) and closed-loop speed control (type N) corresponds to use of the speed-based value ($A_{DES-NB}$). Thus, logic block B59 outputs a desired acceleration ($A_{DES}$) to logic block B72 as one of the two possible separately calculated values.

Still referring to FIG. 3, logic block B60 receives three inputs in this embodiment: the desired speed ($N_{DES}$) from logic block B54, the desired torque ($T_{DES}$) from logic block B53, and the output of logic block B58 indicative of the particular vehicle control type, i.e., closed-loop speed control (N type) or open-loop torque control (T type). Using logic block B60, the controller 35 generates a commanded torque ($T_{CC}$) based on either a closed-loop speed target or an open-loop torque target, with the commanded torque ($T_{CC}$) provided as an input to logic block B70. The commanded torque ($T_{CC}$) may be a commanded output torque of the electric machine 12 in FIG. 1 in a battery electric vehicle embodiment of the motor vehicle 10, for instance, or the commanded torque ($T_{CC}$) may include multiple control signals to multiple different torque actuators, as will be appreciated by those skilled in the art.

Logic block B62 entails generating a vehicle acceleration value using the filter (F) of FIG. 1. In a particular embodiment, the filter (F) is or includes a Kalman filter. In other embodiments, the filter used at logic block B62 may include a low-pass filter, or another application suitable filter capable of filtering out noise from a vehicle speed signal indicative of the measured vehicle speed ($N_{10}$). Logic block B62 therefore entails filtering and differentiating a speed signal of the motor vehicle 10, e.g., from the speed profile determined from the vehicle speed ($N_{10}$) as measured by the speed sensor 21S shown in FIG. 1, to determine a first actual acceleration value (A1). The first actual acceleration value (A1) is fed into logic block B70 as an input.

Logic block B64 entails generating accelerometer based vehicle acceleration. Logic block B64 could utilize the IMU 324 shown in FIG. 1 for this purpose, i.e., with its corresponding lateral and longitudinal acceleration measurements and possibly pitch, roll, and yaw values further refining the calculations. Thus, logic block B64 may entail measuring a second actual acceleration value (A2) using the IMU 324 and thereafter communicating the measurement to the controller 35.

At logic block B70, the controller 35 next arbitrates a commanded acceleration ($A_{CC}$) between torque and speed. That is, the commanded torque ($T_{CC}$) from logic lock B60 is one of two different values depending on the vehicle control type (T or N) determined at logic block B58. When operating in a closed-loop speed control mode, e.g., one-pedal driving, logic block B70 will output the commanded acceleration ($A_{CC}$) to logic block B72 based on the closed-loop speed target applied at logic block B60.

The commanded acceleration ($A_{CC}$) from logic block B70 is determined using the commanded torque ($T_{CC}$) from logic block B60 and the actual acceleration values (A1, A2). Either value A1 or A2 may be used alone, or the two values A1 and A2 may be used together, e.g., averaged with equal of different weights, in order to provide a particular confidence level. Likewise, the motor vehicle 10 may not be equipped with the IMU 324, or the IMU 324 may at times be unavailable or in a fault mode, in which case the present method 100 could possibly proceed using the second actual acceleration value (A2) alone.

At logic block B72, the controller 35 of FIG. 1 analyzes vehicle performance against calibrated hazard metrics upon determination of the desired acceleration ($A_{DES}$) from logic block B59 and the actual acceleration ($A_{CC}$) from logic block B70. As part of logic block B72, the controller 35 may calculate the acceleration delta value (see logic block B106 of FIG. 2) as a difference between the desired acceleration ($A_{DES}$), which is either torque-based or acceleration based depending on the results of arbitration at logic block B59, and the commanded acceleration ($A_{CC}$) from logic block B70, which likewise is determined based on torque or speed targets depending on the vehicle control type (T or N) from logic block B58.

Additionally at logic block B72, the controller 35 uses the acceleration delta value to detect an unintended acceleration. For example, during a speed control maneuver such as one-pedal driving, the controller 35 could compare the acceleration delta value to a calibrated acceleration threshold, e.g., 0.2 g-0.4 g in 300-600 ms. Although particularly useful at low speeds where threshold accelerations are especially noticeable by an operator and passengers of the motor vehicle 10, the present teachings could be used to advantage in open-loop torque control modes at higher speeds, as will be appreciated by those of ordinary skill in the art. The controller 35, in response to the acceleration delta value exceeding a threshold in this manner, may output a fault signal (FLT) to logic block B74, with the fault signal (FLT) being indicative of the unintended acceleration.

At logic block B74 of FIG. 3, the controller 35 may selectively execute a control action (CA) in response to the fault signal (FLT) from logic block B72. Such a control action may include reducing the output torque (arrow $T_O$) or an output speed of the motor vehicle 10 shown in FIG. 1, or temporarily disabling the powertrain system 11 via the controller 35, which would necessitate a new key-on cycle, when the acceleration delta value exceeds a calibrated threshold indicative of the unintended acceleration, as noted above. Other suitable remedial control actions may be conceived of short of partially or fully disabling the powertrain system 11, including but not limited to recording a diagnostic code, lighting an indicator lamp, etc. Such actions could likewise be used in circumstances in which the threshold is closely approached but not exceeded.

The above-described controller 35 of FIG. 1, when programmed and equipped to execute the method 100 as set forth above, provides a control strategy for calculating desired and commanded accelerations of the motor vehicle 10. Desired acceleration is calculated by accounting for external forces on the motor vehicle 10, while typical commanded acceleration is replaced herein by actual acceleration. Actual acceleration in turn may be measured and/or filtered from a speed signal or estimated using state models. Using desired and actual accelerations determined in this manner, the controller 35 is able to monitor ongoing vehicle performance against calibrated acceleration-based hazard metrics, primarily but not necessarily in closed-loop speed control modes such as one-pedal driving.

Improved hazard detection accuracy achieved using the method 100 is therefore intended to reduce instances in which the controller 35 shuts down the motor vehicle 10 or otherwise takes overly aggressive preemptive actions under acceleration conditions that, in actuality, are not indicative of unintended acceleration. These and other benefits will be readily appreciated by those skilled in the art in view of the foregoing disclosure.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims. Moreover, this disclosure expressly includes combinations and sub-combinations of the elements and features presented above and below.

What is claimed is:

1. A method for detecting an unintended acceleration of a motor vehicle during a closed-loop speed control mode, the motor vehicle having a powertrain system with at least one torque generating device, the method comprising:
determining, via a controller, a measured speed of the motor vehicle and external forces collectively acting on the motor vehicle;
calculating a desired acceleration, via the controller, using the measured speed and the external forces;
determining an actual acceleration of the motor vehicle, which includes filtering a speed signal as a first actual acceleration value and/or measuring a second actual acceleration value using an inertial measurement unit (IMU) of the motor vehicle;
during the closed-loop speed control mode, calculating an acceleration delta value as a difference between the desired acceleration and the actual acceleration;
detecting the unintended acceleration during the closed-loop speed control mode, via the controller, using the acceleration delta value; and
wherein determining the actual acceleration of the motor vehicle includes filtering the measured speed as a first speed signal, differentiating the first speed signal to produce the first actual acceleration value, measuring the second actual acceleration value using the IMU, and calculating the actual acceleration as a weighted function of the first actual acceleration value and the second actual acceleration value.

2. The method of claim 1, wherein detecting the unintended acceleration includes positive acceleration or negative acceleration.

3. The method of claim 1, wherein determining the external forces collectively acting on the motor vehicle includes measuring and/or calculating a grade load and/or an external road load of the motor vehicle.

4. The method of claim 3, wherein determining the external forces collectively acting on the motor vehicle includes measuring and/or calculating a mass load and/or a braking load of the motor vehicle.

5. The method of claim 1, wherein filtering the speed signal includes filtering the speed signal through a Kalman filter.

6. The method of claim 1, further comprising:
temporarily reducing an output torque and/or an output speed of the powertrain system, via the controller, when the acceleration delta value exceeds a calibrated threshold indicative of the unintended acceleration.

7. The method of claim 1, further comprising:
measuring a speed of the motor vehicle using a rotary encoder and/or a wheel speed sensor of the motor vehicle.

8. The method of claim 1, wherein the motor vehicle includes at least one driver input device, and wherein the closed-loop speed control mode is a one-pedal driving mode in which a speed of the motor vehicle is controlled solely in response to a state of the at least one driver input device.

9. A powertrain system for a motor vehicle, comprising:
at least one torque generating device coupled to a set of road wheels of the motor vehicle;
a controller configured for detecting an unintended acceleration of the motor vehicle during a closed-loop speed control mode via execution of instructions, wherein the execution of the instructions causes the controller to:
determine external forces collectively acting on the motor vehicle;
calculate a desired acceleration of the motor vehicle using the external forces and a measured speed of the motor vehicle;
determine an actual acceleration of the motor vehicle, which includes filtering a speed signal as a first actual acceleration value and/or measuring a second actual acceleration value using an inertial measurement unit (IMU) of the motor vehicle;
during the closed-loop speed control mode, calculate an acceleration delta value as a difference between the desired acceleration and the actual acceleration;
use the acceleration delta value to detect the unintended acceleration during the closed-loop speed control mode; and
control a dynamic state of the motor vehicle in response to the unintended acceleration; and
wherein the motor vehicle includes the IMU, and wherein the execution of the instructions causes the controller to determine the actual acceleration of the motor vehicle by filtering the speed signal as a first speed signal, differentiating the first speed signal as the first actual acceleration value, measuring the second actual acceleration value using the IMU, and calculating the actual acceleration as a weighted function of the first actual acceleration value and the second actual acceleration value.

10. The powertrain system of claim 9, wherein the execution of the instructions causes the controller to determine the external forces collectively acting on the motor vehicle by measuring and/or calculating a grade load and/or an external road load of the motor vehicle using a corresponding sensor.

11. The powertrain system of claim 9, wherein the execution of the instructions causes the controller to determine the external forces collectively acting on the motor vehicle by determining a mass load and/or a braking load of the motor vehicle.

12. The powertrain system of claim 9, wherein the execution of the instructions causes the controller to filter the speed signal of the motor vehicle through a Kalman filter to determine the first actual acceleration value.

13. The powertrain system of claim 9, wherein the controller is configured to temporarily reduce an output torque and/or an output speed of the powertrain system as the dynamic state when the acceleration delta value exceeds a calibrated threshold indicative of the unintended acceleration.

14. The powertrain system of claim 9, further comprising:
a transmission having an output member;
a rotary encoder positioned on or in proximity to the output member of the transmission; and
a wheel speed sensor coupled to at least one of the road wheels, wherein the measured speed is one or both of a rotary speed of the output member as measured by the rotary encoder and a rotary speed of the at least one of the road wheels as measured by the wheel speed sensor.

15. The powertrain system of claim 9, wherein the closed-loop speed control mode is a one-pedal driving mode in which the controller is configured to control a speed of the motor vehicle solely in response to actuation of a driver input device, and wherein the driver input device is an accelerator pedal, a brake pedal, and/or a regeneration paddle.

16. An electric vehicle including the powertrain system of claim 9, wherein the motor vehicle is further defined as the electric vehicle, the electric vehicle comprising:
- a driver input device, including one or more of an accelerator pedal, a brake pedal, and a regeneration paddle;
- an electric propulsion motor coupled to one or more of the road wheels; and
- wherein the controller is configured for detecting the unintended acceleration of the electric vehicle during a one-pedal drive (OPD) mode, the OPD mode is the closed-loop speed control mode during which the controller regulates a rotary speed of the electric propulsion motor below a threshold speed solely in response to actuation of the driver input device.

17. The electric vehicle of claim 16, wherein the control of the dynamic state includes temporarily reducing an output torque and/or an output speed of the electric propulsion motor as the dynamic state.

18. The electric vehicle of claim 16, wherein the controller is configured to determine the actual acceleration of the motor vehicle by filtering the speed signal through a Kalman filter.

19. The electric vehicle of claim 16, wherein the controller is configured to determine, as the external forces, each of a grade load, an external road load, a mass load, and braking load of the electric vehicle.

20. The powertrain system of claim 9, wherein the unintended acceleration includes positive acceleration or negative acceleration.

* * * * *